United States Patent [19]

Baker et al.

[11] 4,444,094

[45] Apr. 24, 1984

[54] INTERMITTENT AUTOMATIC GRILL FOR HAMBURGER PATTIES

[75] Inventors: Edward D. Baker, San Francisco; Nils Lang-Ree, Los Altos; John S. Brown, Half Moon Bay, all of Calif.

[73] Assignee: Taylor Freezer Company, Rockton, Ill.

[21] Appl. No.: 422,893

[22] Filed: Sep. 24, 1982

[51] Int. Cl.³ .................. A47J 37/00; A47J 37/04; A47J 37/08
[52] U.S. Cl. ............................ 99/327; 99/339; 99/386; 99/391; 99/423; 99/443 C
[58] Field of Search ............... 99/349, 327, 386, 387, 99/389–391, 400, 339, 427, 423, 443 C, 446; 126/41 C

[56] References Cited

U.S. PATENT DOCUMENTS 3,739,712  6/1973  Duning ..................... 99/390 X
4,189,631  2/1980  Baker et al. ................ 99/390 X

*Primary Examiner*—Timothy F. Simone
*Attorney, Agent, or Firm*—Lothrop & West

[57] ABSTRACT

A frame supports a cross-bar conveyor for advancement over a hamburger patty feeding plate and between upper and lower heated platens. The upper platen is raised by actuators and falls by gravity against adjustable stops in time with advancement of the conveyor. At the discharge end of the conveyor a guide assists in directing a discharging hamburger patty onto a receiving grate.

7 Claims, 5 Drawing Figures

INTERMITTENT AUTOMATIC GRILL FOR HAMBURGER PATTIES

BRIEF SUMMARY OF THE INVENTION

For grilling hamburger patties there is provided a frame supporting a lower, heated platen. A superposed upper, heated platen on the frame is raised by energized solenoids. A cross-bar, chain conveyor on the frame advances hamburger patties from a receiving support to a stopped position between the upper and lower platens in spaced position. The upper platen, due to deenergized solenoids, is in lowered position supported by adjustable stops while the hamburger patties cook, and the conveyor and upper platen are then operated in time so that the hamburger patties are finally discharged onto a discharge rack. Hence the action of the automatic grill is intermittent in travel and pressure.

PRIOR ART

Patents of interest herein and known to applicants are as follows:

U.S. Pat. Nos. 3,580,164, May 25, 1971, 3,965,807, June 29, 1976, 4,023,007, May 10, 1977, 4,151,791, May 1, 1979, 4,154,152, May 15, 1979, 4,182,231, Jan. 8, 1980, 4,188,866, Feb. 19, 1980, 4,246,834, Jan. 26, 1981, 4,254,697, Mar. 10, 1981.

While all of these patents have to do with cooking hamburger patties on a quantity basis and employ in various ways some of the elements employed herein, none discloses a similar combination, nor particularly discloses a similar supporting plate, intermittent time conveyor cross-bar function, a comparable operating structure for a movable intermittent pressure upper platen, nor a comparable discharging arrangement.

This invention speeds cooking of hamburgers by cooking a complete batch simultaneously, overcoming the more lengthy time required if the batch were cooked continuously row by row—requiring slow infeed and discharge times. The intermittent motion of the conveyor allows the batch to be positioned and discharged at higher speeds. There is also significantly less product damage from mechanical action, as the product is moved only when it is frozen or fully cooked, in both cases being thereby relatively free from damage.

This invention improves product quality by assuring consistent thickness with the application of intermittent pressure—first the weight of the upper platen, then the pressure with the upper platen against a predetermined stop. In so doing, product quality is improved by obtaining a superior surface contact between the meat and the platens. This assures a good and consistent "sear" (color and surface texture) and optimizes heat transfer by pressurized conduction. The results are fast cooking and energy saving.

DETAILED DESCRIPTION

Figure 1:
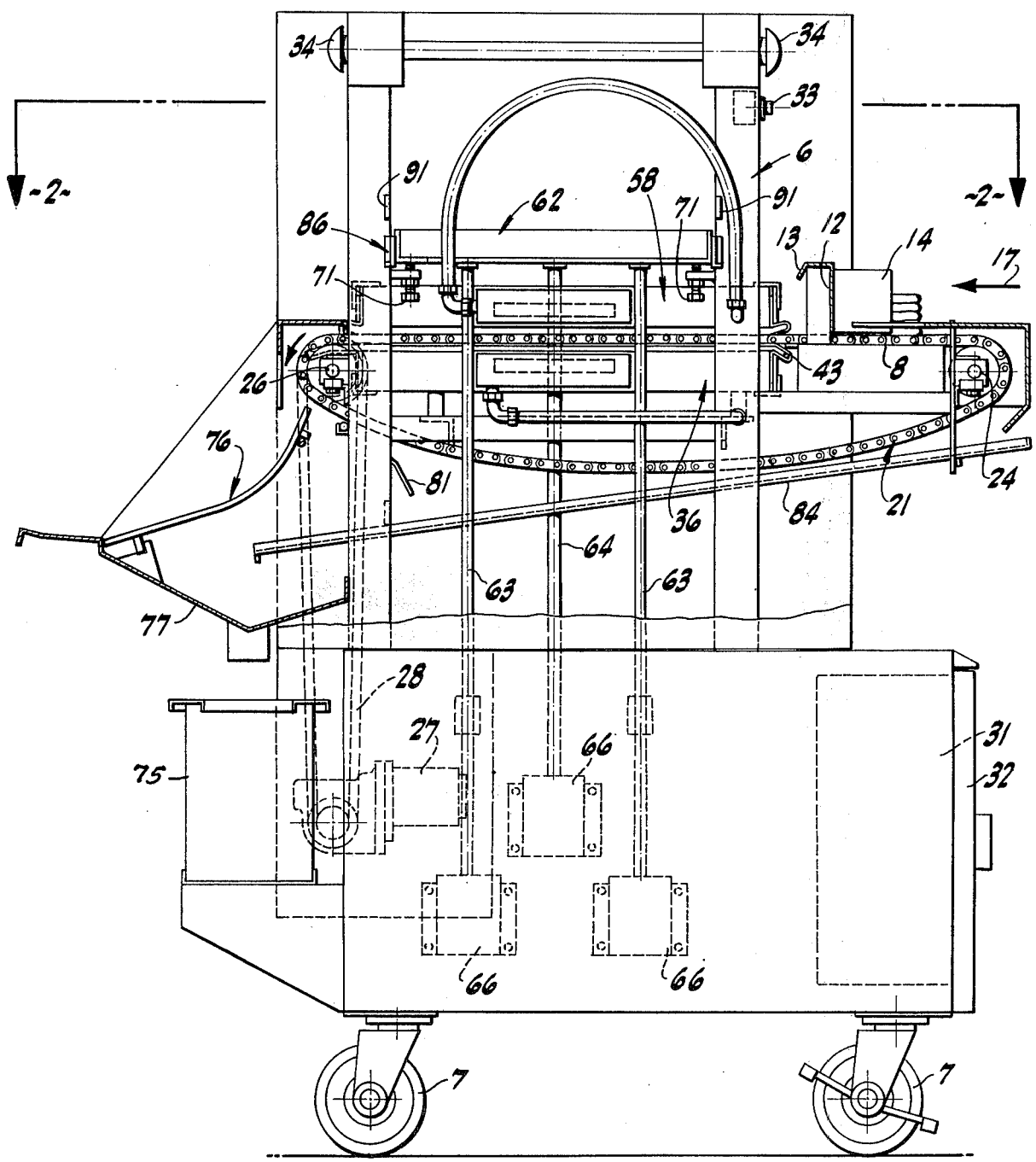
FIG. 1 is a composite view partially in elevation and partially in cross-section on a longitudinal vertical plane showing one form of broiler for hamburger patties constructed pursuant to the invention.

In the quantity cooking of hamburger patties, it is desirable to be able to handle the various patties in their substantially standard form. The patties customarily available are generally circular in plane and have an approximately predetermined, standard thickness and are usually available in frozen condition.

To handle patties of that sort there is preferably provided a main frame 6 comprised of the usual structural shapes and conveniently mounted on caster wheels 7 for ready portability to the vicinity of an electrical outlet (not shown).

On the frame 6 there is provided a supporting plate 8 having a horizontal, planar surface 9 and arranged in a convenient location for an operator who faces a shelf 11 formed around part of and supported on the frame 6. The plate 8 has an upwardly extendingly wall 12 and a finish angle 13 so that hamburger patties can be stacked on the plate 8 in any one or more of several feed compartments defined by upright intervening walls 14 and end walls 15. In this instance there are three such positions for the entering patties, although there can be any desired number.

Adapted to sweep over or across or along the surface 9 is a conveyor including spaced-apart bars 16 extending transversely of the machine and transversely of the direction 17 of advance. At their ends, the cross-bars are appropriately mounted in links 18 of endless conveyor chains 21. The chain pairs are mounted around appropriate sprockets 22 at one end and sprockets 23 at the other end. These in turn are supported by cross shafts 24 and 26 appropriately journalled in the frame 6.

A suitable electric drive motor 27 on the frame is joined by a chain 28 to a sprocket 29 on the shaft 26 for driving the conveyor chains. The motor 27 is under the control of a regulating device (not shown) within a control box 31 on the frame and accessible through a door 32. The motor 27 is also under the control of a start button 33 on the frame and easily available to the operator. Also, the motor 27 is subject to emergency stop buttons 34 accessible on opposite sides of the frame 6.

When the motor 27 is energized and the conveyor chains 21 are advanced, one of the successive cross-bars 16 encounters the exposed, trailing edge of the lowermost hamburger patty in each of the stacks. The bar 16 then advances such patties over and along the plate 8. The remaining, superposed, stacked patties fall by gravity into lowermost position for subsequent, similar feeding.

The advancing patties leave the plate 8 and enter onto a lower, heated platen 36 removably secured to the frame 6 by fastenings 37. The platen 36 may be a composite structure having an exterior frame or pan 38 usually of metal and within which is disposed a heating element 39 of a convoluted electrical conductor 40 within a containing body 41. Alternatively, the platen may be a casing with the required electric element cast in, or, the platen may be a casting or plate structure with a tubular interior circuit or manifold system for circulation of heat transfer fluids, such as oils, etc. The platen is closed on top by an upper plate 42 providing a generally flat, planar nature co-planar with and closely adjacent to the plate 8. Conveniently, there is a downturned lip 43 at the leading end of the platen 36 and a similar downturned lip 44 at the trailing end thereof.

In order to afford a superior surface for sliding hamburger patties onto, along and off of the lower platen, the facing cooking surfaces of the upper platen 42 and lower platen 36 are each covered with a plastic sheet 46 conveniently of a low-friction material such as "Teflon" or the like. The ends of such material are brought around the ends of the platen frame 38 and of the platen 58 and are secured in position for example by a clamp plate 51 held by a suitably fastened angle 52. A similar clamp plate and angle is utilized at the other, discharge end of the lower and upper platens.

As the conveyor advances, a predetermined number of rows of hamburger patties from the plate 8 continues on to the Teflon surface of the lower platen 36 and slides thereover to a prescribed initial cooking location. Hence, a predetermined batch of patties is fed and can be simultaneously cooked.

Figure 2:
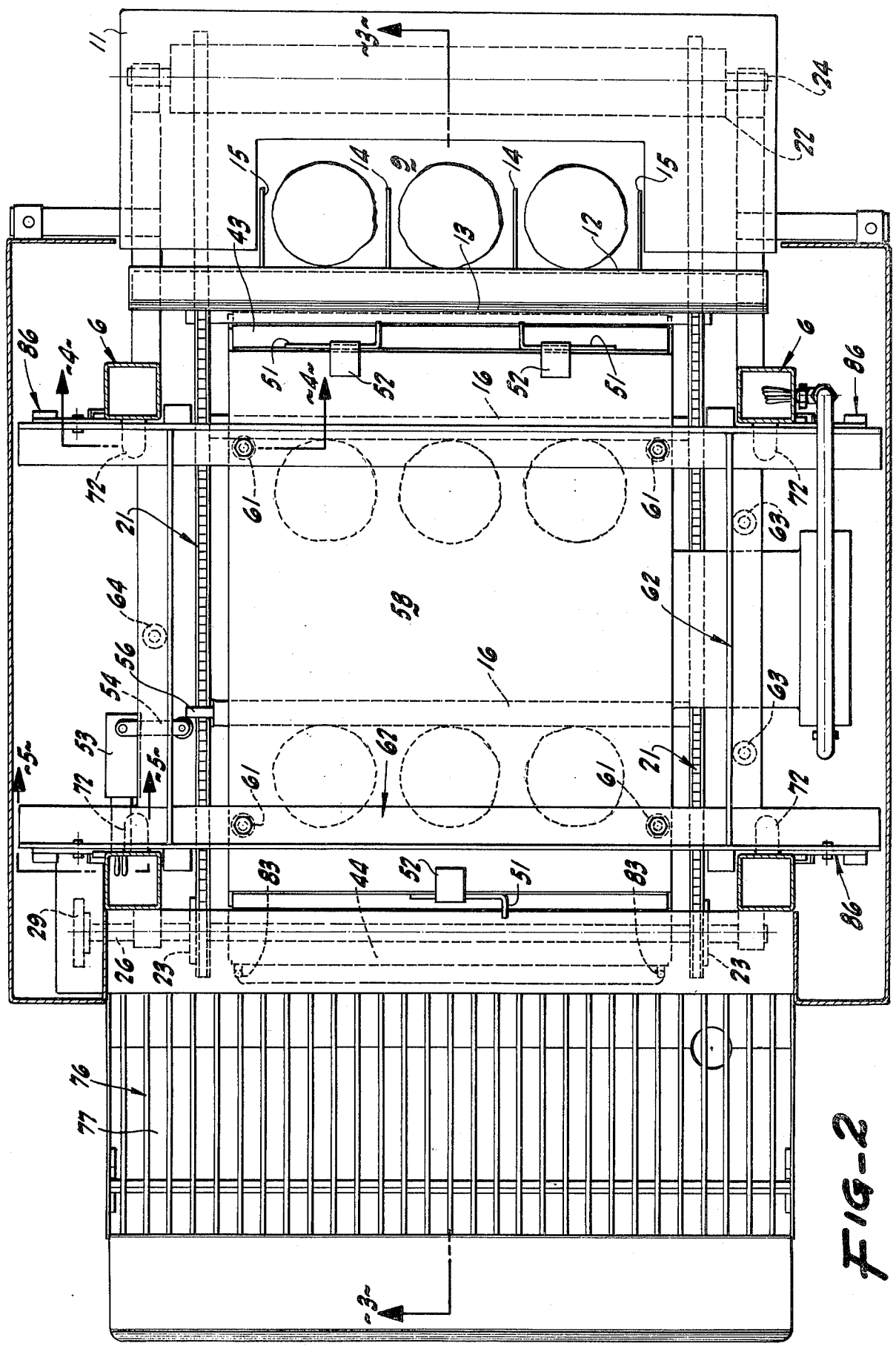
FIG. 2 is a cross-section, the plane of which is indicated by the line 2—2 of FIG. 1, and is to an enlarged scale.
Figure 3:
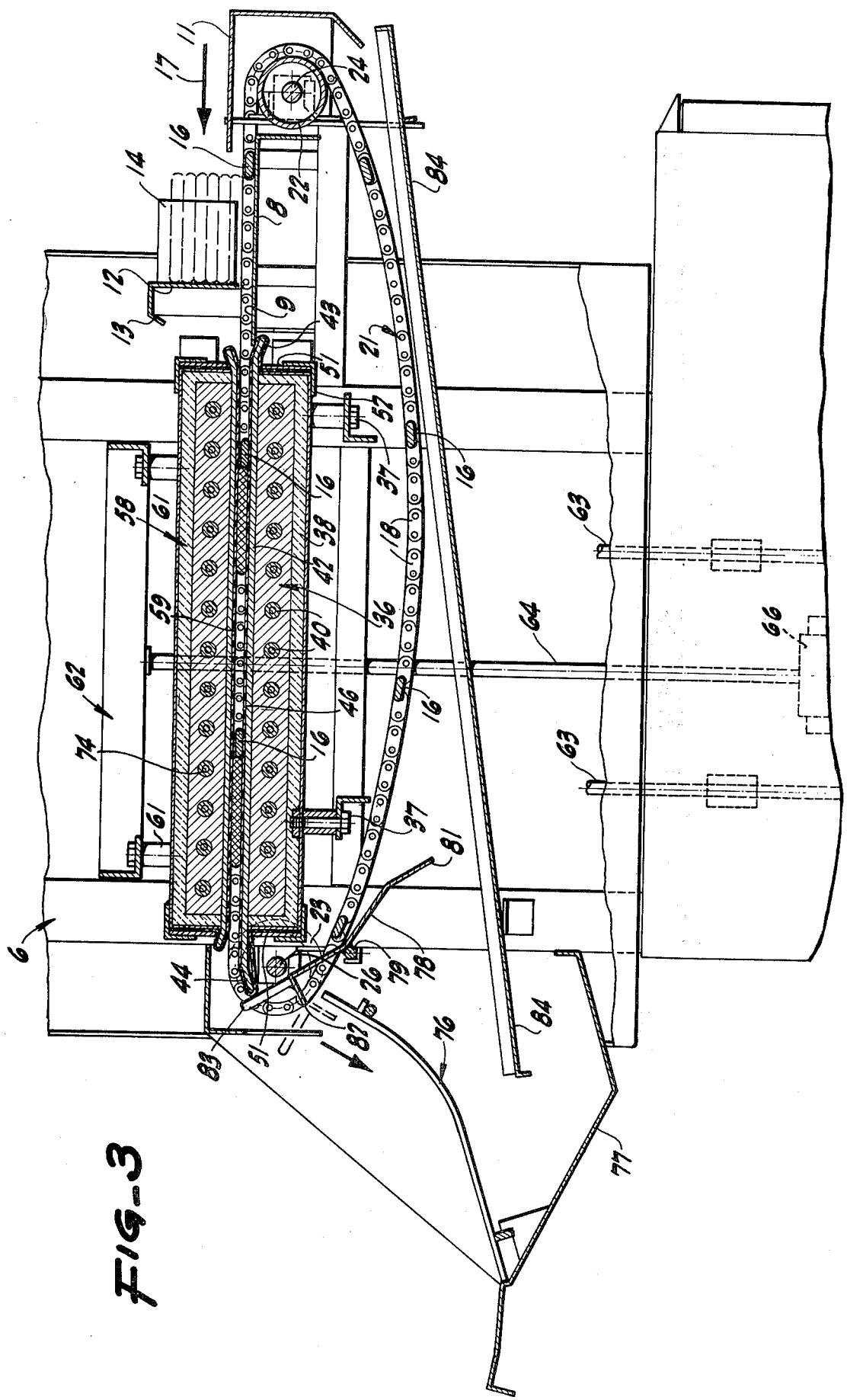
FIG. 3 is a cross-section to an enlarged scale with the plane of section being indicated by the line 3—3 of FIG. 2.

At this stage of advance, when the batch to be cooked has been fed, the conveyor is stopped by a switch 53 (FIG. 2) on the frame and by a programming mechanism in the control box 31. A switch lever 54 for actuating the switch 53 is in the path of the projecting end 56 of each bar 16. The relations of the parts are such that the switch is actuated to stop the conveyor when the batch to be cooked is in proper position, as shown in FIGS. 2 and 3.

In order properly to cook the patties resting stationarily on the lower, heated platen, there is provided an upper, vertically movable platen 58, the general construction of which is virtually a duplicate of that of the lower platen 36. Included is a Teflon sheet 59 covering the otherwise exposed, nether cooking surface thereof. The platen 58 is joined through spacers 61 to a carrying frame 62 disposed in the upper portion of the framework. The frame 62 is raised and lowered with appropriate solenoid rods 63 and 64 on opposite sides of the frame and each extending downwardly toward the bottom of the frame to engage solenoid cores in appropriate solenoids 66 secured to the frame 6.

By this arrangement, the upper platen is raised by a plurality of energized actuating devices 66 acting on one lateral edge thereof and on the other lateral edge thereof. In place of the solenoids there may be used devices acting by air or hydraulic cylinders or other mechanical lifting means. The upper platen rises when the solenoids are energized and falls by gravity when the solenoids are de-energized. The electrical control for the solenoids is by suitable circuitry within the control box 31 and is arranged to act in time with the operation of the conveyor.

While the upper platen can be permitted to lower and to rest simply by gravity on the hamburger patties that happen to be in position, it is desirable to limit the amount of downward motion of the upper platen at the desired patty thickness. The limited pressure thus produced causes a high degree of uniformity in cooking, as it provides uniform thickness of product, overcoming irregularities. The limited pressure contact also enhances the desirable sear of the product from the conductive heat transfer and, importantly, the pressurized conductive heat transfer both reduces cooking time and reduces energy requirements.

Figure 4:
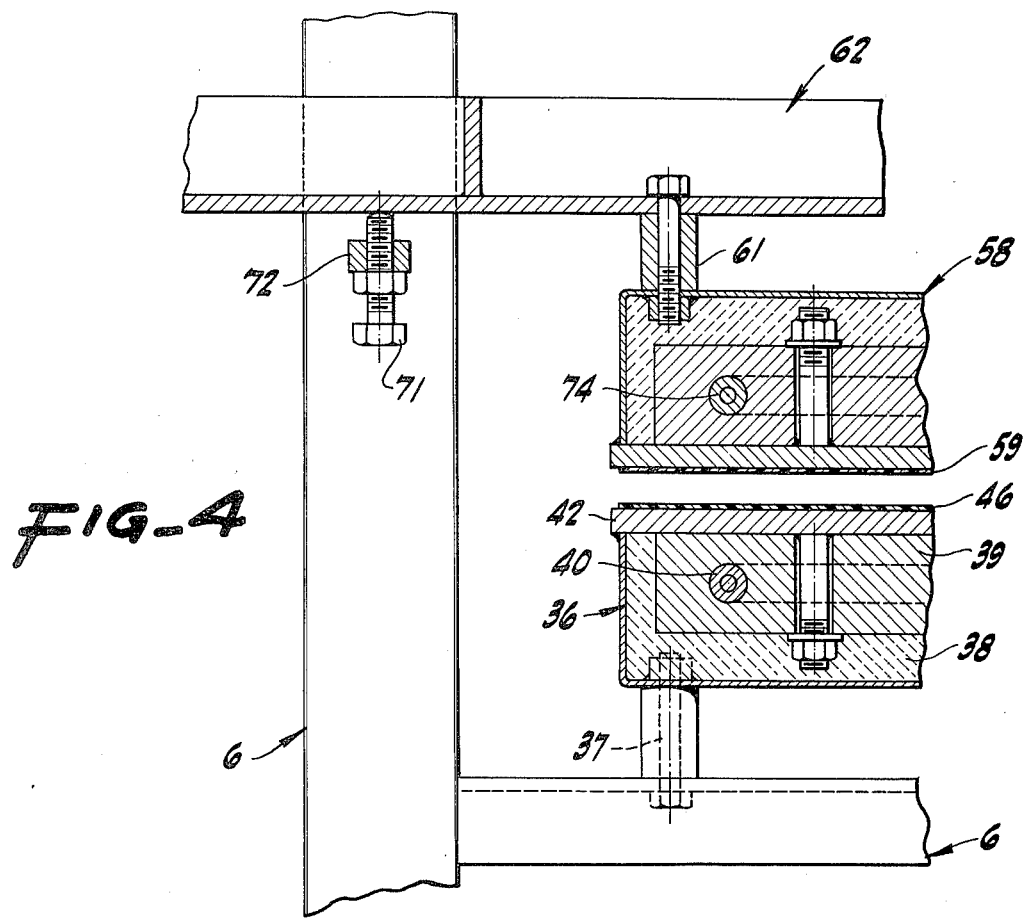
FIG. 4 is a cross-section in detail and to an enlarged scale, the section line being indicated by the line 4—4 of FIG. 2.

To that end, there is provided a plurality of stop screws 71 (FIG. 4) engaging in cross-bars 72 on the main frame 6. The screws 71 are adjustable and secured by lock nuts 73 to interfere at a given elevation with lowering movement of the frame 62. When the stops are slacked off completely, the upper plate rests solely by gravity on the hamburger patties. When the stops 71 are operative, the space between the upper and lower platen is limited or fixed.

The upper platen has heating elements 74 therein quite similar to the elements 39 in the lower platen and similarly controlled. The temperature of the upper platen and of the lower platen is usually regulated by mechanism in the control box 31 to substantially the same value, although different temperatures can be employed if deemed desirable.

After hamburger patties have been placed in their initial cooking position and the conveyor has stopped and the upper platen has lowered, a suitable cooking period ensues as regulated by mechanism in the control box 31. Following this, the solenoids 66 are energized and the upper platen 58 is lefted a predetermined amount. The conveyor is then again energized, and the cross-bars advance the cooked batch of hamburger patties to the discharge position. Thereafter, the patties slide by gravity onto the discharge rack 76.

The discharging, cooked hamburger patties tend to fall by gravity onto a discharge rack 76, preferably made up of a number of shaped, parallel bars disposed over a grease-draining tray 77 on the frame. The tray 77 drains into a removable container 75.

Since the hamburger patties sometimes tend to stick and not to leave the cross-bars easily, there is provided a transfer mechanism. Included is a lever plate 78 having a pivot rod 79 rotatable on the frame and extending to afford a counterweight end 81. The plate also has an angled portion 82 substantially in the path of a discharging hamburger patty. Also, the plate 78 has a pair of projecting rods 83 in the path of the cross-bars 16. These rods prevent the cross-bars from jamming into the transfer plate. As the conveyor advances to discharge the cooked hamburger patties, the cross-bars abut the rods 83 and rotate the discharge mechanism around the axis of the cross shaft 79. The plate 82 is thus moved into a transfering position and dislodges and guides the cooked hamburger patties from the conveyor so that they are transferred to fall readily onto the grid 76.

The cross-bars of the conveyor return in the lower run of the conveyor for repetition of their duty, whereas the transfer lever plate 78 falls back into its FIG. 3 position under the influence of the counterweight 81.

Grease is collected in a drain pan 84 from the hamburger patties on the rack 76, and any miscellaneous grease developed and dropping during the cooking process is intercepted by the inclined drain pan 84 which extends entirely beneath the conveyor mechanism from an upper level at the entry end to a lower level at the exit end and conducts any intercepted grease to an interceptor 77. The grease in turn drains into the grease drain pan 75.

Figure 5:
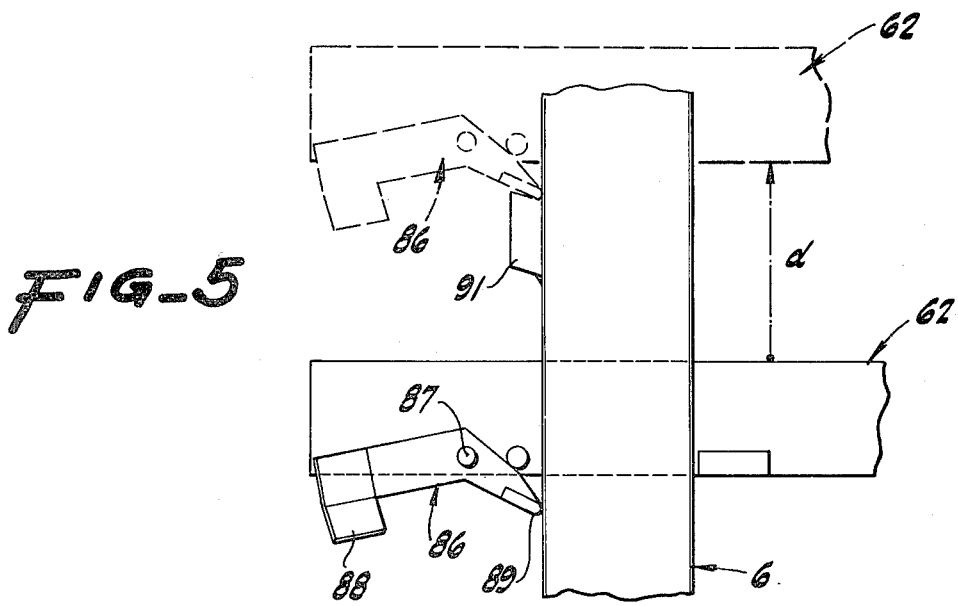
FIG. 5 is a cross-section of a detail to an enlarged scale, the plane of section being indicated by the line 5—5 of FIG. 2.

In the servicing of the machine, it is sometimes advisable or desirable to lift the upper platen 58 from its normal position or positions to an extra elevated position so that cleaning can be done between the upper platen and the lower platen and to facilitate the repositioning of the Telfon coverings. For that reason the upper platen preferably carries at least one latch lever 86 (FIG. 5) mounted on a pivot 87. The lever 86 has a counterweight 88 as well as a lip 89 that can override and rest upon a lug 91 on an upright portion of the frame 6 to hold the upper platen at a substantial distance above the normal position thereof. To release the upper platen it is only necessary to lift the platen slightly and manually to rotate the lever 86 out of the holding position. The upper platen can then descend either to rest upon the adjusting screws 71 (FIG. 4) or to descend by gravity to rest upon any hamburger patties that may be resting upon the lower platen or can descend by gravity even to rest upon the bars 16.

We claim:

1. An intermittent automatic grill for hamburger patties comprising a frame, a lower platen having an upper cooking surface, means for fixing said lower platen on said frame with said upper surface substantially horizontal, supporting stops mounted for variable vertical positioning on said frame, an upper platen having a lower cooking surface, means for disposing said upper platen to rest on said stops in registry above said lower platen with said lower cooking surface substantially parallel to said upper cooking surface, means intermittently energizable and effective when energized for lifting and holding said upper platen relative to said frame and spaced above said stops, means for heating said lower platen and said upper platen, a chain conveyor having cross-bars spaced apart a distance greater than the diameter of a patty, means for mounting said chain conveyor on said frame for advancement of at least one of said cross-bars between said lower platen and said upper platen, means for advancing said conveyor intermittently, means on said frame for supporting a hamburger patty substantially level with and in the path of advancement of said cross-bar over said supporting means and onto said lower platen, means operating in time with the intermittent advancement of said chain conveyor for energizing and deenergizing said lifting and holding means, means on said frame for receiving a hamburger patty discharged from said lower platen by said cross-bar, and means interposed between said lower platen and said receiving means for guiding a hamburger patty therebetween.

2. A device as in claim 1 in which said means for advancing said cross-bar includes an electric control for advancing said cross-bar intermittently and for lifting and holding said upper platen as said cross-bar is advancing.

3. A device as in claim 2 in which said means for advancing said cross-bar intermittently includes an electric switch responsive to the position of advance of said cross-bar relative to said lower platen for energizing and deenergizing said lifting and holding means.

4. A device as in claim 1 in which said hamburger patty guiding means includes a plate, means for mounting said plate on said frame to move between a first position substantially immediately under the discharge end of said lower platen and a second position substantially overlying said receiving means, and means operated by said conveyor for moving said plate from said first position to said second position.

5. A device as in claim 4 which said plate mounting means includes a lever carrying said plate, means for pivoting said lever on said frame, a counterweight tending to move said plate in to said first position, a cam rod on said chain conveyor, and a cam follower on said lever in the path of said cam rod.

6. A device as in claim 1 including low-friction plastic sheets on the facing portions of said lower platen and of said upper platen, and means on said upper platen and on said lower platen for holding said plastic sheets removably in place.

7. An intermittent automatic grill for cooking hamburger patties comprising a main support frame, a lower platen having an upper surface, means mounting said lower platen on said main support frame with said upper surface substantially horizontal, a patty support panel mounted on the main support frame with its upper surface adjacent one end of the upper surface of the lower platen for supporting hamburger patties, an upper platen having a lower surface, an upper platen carrying frame for mounting said upper platen for vertical movement on said main support frame in registry above said lower platen, upper platen moving means for moving said upper platen relative to said main support frame and toward and away from said lower platen, means for heating said lower platen and said upper platen, a chain conveyor having a plurality of cross-bars spaced apart a distance greater than the diameter of a patty, means for mounting said chain conveyor on said main support frame for advancing said cross-feed bars in a closed loop course having an upper forward run extending across the upper surfaces of the patty support panel and the lower cooking platen and lower return run below the infeed panel and lower cooking platen, a drive motor operative when energized to drive the chain conveyor in a direction to advance the cross-bars in a forward direction along said upper forward run, control means for controlling operation of said drive motor, said control means including cycle start means for energizing the drive motor to advance the cross-bars and means operative when the conveyor has advanced at least one cross-bar across the patty support panel and to a patty cooking position overlying the upper surface of the lower platen for stopping the conveyor, said control means including means operative when the conveyor is stopped for operating said upper platen moving means to lower said upper platen to rest on a patty on said lower paten, a plurality of adjustable stops arranged to engage said platen carrying frame at a plurality of locations therearound for limiting downward movement of said upper platen to a preselected spacing above the lower platen corresponding to a desired patty thickness, said control means including means for operating said upper platen moving means to lift said upper platen away from said lower platen a preselected cooking period after lowering of the upper platen, said control means including means for energizing said drive motor after the upper platen is lifted to advance the cross-bars and move a cooked patty off the lower platen, means on the frame for receiving a hamburger patty discharged from said lower platen by the cross-bars, and means interposed between said lower platen and said receiving means for guiding a patty therebetween.

* * * * *